Patented July 19, 1949

2,476,822

UNITED STATES PATENT OFFICE

2,476,822

PREPARATION OF RUBBERLIKE COPOLYMER OF 1,3-BUTADIENE AND STYRENE WHICH CONTAINS AMINE ACTIVATOR

Alvin D. Miller, Cuyahoga Falls, Ohio, assignor to The Firestone Tire & Rubber Company, Akron, Ohio, a corporation of Ohio No Drawing. Application October 22, 1945, Serial No. 623,860

2 Claims. (Cl. 260—85.1)

This invention relates to a synthetic rubber to be used for wire insulation, as for insulating cables, etc. More particularly, it relates to such insulation prepared from a rubber-like copolymer of 1,3-butadiene and styrene which contains as an activator of vulcanization acceleration an alkyl primary amine salt of a soap-forming fatty acid. The invention includes the vulcanization of such a rubber as insulation around a wire.

It is recognized that for wire insulation alum-coagulated rubber-like copolymers of 1,3-butadiene and styrene (such as the rubber known as GR-S) are superior to such copolymers coagulated by other reagents because of their low ash, etc. However, the continuous cure used by most wire manufacturers (including manufacturers of cable) requires a faster curing compound than the usual GR-S mixes. The first attempts to accelerate the cure by adding an amine to the latex were unsuccessful because the amine forms a salt with the soap used as a dispersing agent in the copolymer latex; and such salt formation, by removing soap from the reaction mixture, caused preflocculation or precoagulation.

It has been found that the amine salt of a fatty acid has the same activating effect as the amine itself. According to the present invention, the amine salt is used as the activator. The amine may be added as a salt, or it may be added to a latex which contains sufficient excess soap to produce a salt without precoagulation.

The amine used as an activator is a primary alkylmonoamine containing, for example, about eight up to twenty or more carbon atoms, such as octylamine, dodecylamine, stearylamine, etc. A commercial mixture of such amines sold by Armour and Company, of Chicago, as AM118.5B is satisfactory and was used in the operations to which the following examples refer. The salt is produced by reacting the amine with an equivalent amount of a soap-forming fatty acid, such as stearic acid, oleic acid, etc. The salt formed is referred to herein as a primary alkylmonoamine salt of soap-forming fatty acid containing eight to about twenty carbon atoms in the alkyl group.

The following examples are illustrative of the invention:

Example 1

In this example the copolymer was prepared according to the following formula:

Parts per 100 parts monomer
Water ------------------------------- 180
1,3-Butadiene ------------------------ 72
Styrene ------------------------------ 28
Catalyst (potassium persulfate) ------- 0.3
Modifier (mixed higher alkyl mercaptans) - 0.46
Soap chips --------------------------- 4.75
Stearic acid -------------------------- 0.67

The amine soap was added after copolymerization and removal of unreacted 1,3-butadiene and styrene; i. e., after the usual stripping operation. Thirteen pounds of the commercial AM118.5B amine (0.20 part per 100 parts of the dry rubber) were melted and added with agitation to 20 gallons of 9.1 per cent soap solution at 70° C. After about 5 minutes, during which the mixture became more viscous, the solution was diluted to 40 gallons having a soap content of 4.55 per cent. This solution contains no more than a slight excess of soap over that required for formation of the amine salt. The emulsion prepared in this way was added to the latex at a temperature of 60° C. after stripping. The anti-oxidant which was of a usual type was added in the usual manner at the beginning of the stripping operation.

For coagulation a 2 per cent solution of $Al_2(SO_4)_3 \cdot 18H_2O$ was employed. The amount used was equivalent to 4 pounds of $Al_2(SO_4)_3$ per 100 pounds of GR-S. The GR-S coagulum was dried at 230° F. The copolymer reaction took around 14 or 15 hours, and the reaction temperature was 123° F. The product had an ash of 0.50 per cent, and on curing at 292° F. for the minutes indicated in the following table, test samples were found to have the following physical properties:

|  | Control | Improved Rubber |
|---|---|---|
| Crude stock: Mooney (L4) | 42 | 42 |
| Compounded stock: Mooney (L4) | 53 | 53 |
| Cure temperature °F | 292 | 292 |
| Elongation: |  |  |
| 25 min | 750 | 760 |
| 50 min | 625 | 625 |
| 90 min | 555 | 530 |
| 300% Modulus: |  |  |
| 25 min | 395 | 535 |
| 50 min | 835 | 1,035 |
| 90 min | 1,250 | 1,350 |
| 500% Modulus: |  |  |
| 25 min | 850 | 1,175 |
| 50 min | 1,800 | 2,175 |
| 90 min | 2,525 | 2,785 |
| Tensile strength: |  |  |
| 25 min | 1,340 | 2,050 |
| 50 min | 2,525 | 3,000 |
| 90 min | 3,000 | 3,100 |

The improved rubber is designed for cable and other wire insulation. It will be compounded with vulcanizing ingredients as any other GR-S rubber; and plasticizers, etc., may be added as is usual in the preparation of wire and cable insulation. The coatings will preferably be applied by extrusion in the usual manner, and due to the presence of the amine salt the vulcanization will be more rapid than with usual GR-S vulcanizations. The cure may be carried out at 292° F. or at any other desired temperature.

*Example 2*

Another example was prepared according to the following copolymerization formula:

|  | Parts per 100 parts monomer |
|---|---|
| Water | 180 |
| Catalyst | 0.3 |
| Soap | 5.0 |
| Styrene | 25.0 |
| Modifier | 0.7 |
| 1,3-Butadiene | 75.0 |
| Amine (AM118.5B) | 0.2 |

In this example the amine was dissolved in a small portion of the styrene and added to the reaction mixture after the balance of the styrene. The reaction time for 1200 pounds of monomer was 19 hours. The amount of soap used was sufficiently greater than that required for dispersion to prevent preflocculation. The Mooney (ML4) viscosity of the crude was 51; and of the compounded stock, 57.

*Example 3*

In this example the amine was added to the reaction mixture as an amine salt of the soap fatty acids. The formula was:

|  | Parts per 100 parts of monomer |
|---|---|
| Water | 180 |
| Catalyst | 0.3 |
| Soap | 5.0 |
| Styrene | 25.0 |
| Modifier | 0.1 |
| 1,3-Butadiene | 75.0 |
| Amine (AM118.5B) | 0.2 |

The molten amine was poured into a concentrated soap solution at 155° F. under agitation, and after ½ hour's agitation the solution was brought to proper concentration by addition of the balance of the water. The reaction time for 1200 pounds of monomer was 15½ hours, and the reaction temperature was 122° F. The Mooney (ML4) of the crude was 51; and of the compounded rubber, 53.

Test samples of Examples 2 and 3 cured at 292° F. for the number of minutes indicated in the following table had the following properties:

|  | Cure at 292° F. | Control | Example 2 | Example 3 |
|---|---|---|---|---|
|  | Minutes |  |  |  |
| Elongation | 25 | 750 | 625 | 635 |
|  | 50 | 625 | 520 | 550 |
|  | 90 | 555 | 510 | 500 |
| 300% Modulus | 25 | 395 | 625 | 740 |
|  | 50 | 835 | 1,050 | 1,175 |
|  | 90 | 1,250 | 1,275 | 1,475 |
| 500% Modulus | 25 | 850 | 1,300 | 1,575 |
|  | 50 | 1,800 | 2,175 | 2,425 |
|  | 90 | 2,525 | 2,650 | 3,025 |
| Tensile | 25 | 1,340 | 1,650 | 2,100 |
|  | 50 | 2,435 | 2,300 | 2,900 |
|  | 90 | 3,000 | 2,750 | 3,025 |

From the standpoint of production the procedure of Example 3 or of Example 1 appears preferable. The procedure of Example 1 has the advantage that it is possible to select a batch of preferred Mooney (between about 39 and 45, known as GR-S type 20) before adding the amine.

The dispersions of Examples 2 and 3 were coagulated in the usual way with aluminum sulfate by adding 4 parts of aluminum sulfate per 100 parts of the monomer. It cures rapidly and is in every way satisfactory for wire insulation.

Tests using a relatively pure amine, such as dodecylamine, instead of the commercial amine of the above examples gave satisfactory results.

The invention is not limited to the above details but is defined in the appended claims. The amine may be added before reaction with fatty acids or as a salt. If sufficient soap is employed, the amine may be added during coagulation or after. If carbon black or other pigment is compounded with the latex, the amine may be reacted with soap in the pigment dispersion and may be added to the latex with the pigment.

What I claim is:

1. The method of producing rubber-like coagulum of 1,3-butadiene and styrene, which coagulum contains uniformly distributed therein a salt of a primary alkyl monoamine for activation of the vulcanization of the copolymer, the alkyl group containing eight to twenty carbon atoms, the amine being otherwise unsubstituted, which comprises coagulating with aluminum sulfate the dispersion of copolymer which results from emulsion copolymerization of the 1,3-butadiene and styrene and contains sufficient soap to maintain a dispersion of the coagulum and in addition contains a small amount of the primary monoamine salt of soap-forming fatty acid whereby coagulum of the copolymer is obtained which contains uniformly distributed therein sufficient of said amine salt to serve as an accelerator of vulcanization on subsequent vulcanization of the copolymer.

2. The method of producing rubber-like coagulum from soap-dispersed emulsion resulting from emulsion copolymerization of 1,3-butadiene and styrene, which comprises adding to the emulsion a soap-dispersed emulsion containing primary alkyl monoamine salt of soap-forming fatty acid sufficient to serve as an activator of the vulcanization of the copolymer, the alkyl group containing eight to twenty carbon atoms, the amine being otherwise unsubstituted, and then coagulating the resulting emulsion with aluminum sulfate to obtain coagulum of the copolymer in which said amine salt is uniformly distributed.

ALVIN D. MILLER.

REFERENCES CITED

The following references are of record in the file of this patent:

UNITED STATES PATENTS

| Number | Name | Date |
|---|---|---|
| 2,378,693 | Fryling | June 19, 1945 |
| 2,393,133 | White | Jan. 15, 1946 |
| 2,395,505 | Sarbach | Feb. 26, 1946 |